(12) United States Patent
Napier et al.

(10) Patent No.: US 8,371,521 B2
(45) Date of Patent: Feb. 12, 2013

(54) LOW NOISE EXHAUST DUCTING SYSTEM

(75) Inventors: James C. Napier, San Diego, CA (US); Jay M. Francisco, Chula Vista, CA (US)

(73) Assignee: Pratt & Whitney, East Hartford, CT (US)

( * ) Notice: Subject to any disclaimer, the term of this patent is extended or adjusted under 35 U.S.C. 154(b) by 1173 days.

(21) Appl. No.: 11/724,644

(22) Filed: Mar. 15, 2007

(65) Prior Publication Data

US 2007/0214767 A1 Sep. 20, 2007

Related U.S. Application Data

(60) Provisional application No. 60/783,314, filed on Mar. 16, 2006.

(51) Int. Cl.
*B64D 41/00* (2006.01)
*F02K 1/00* (2006.01)
*F02G 1/00* (2006.01)

(52) U.S. Cl. ............ 244/58; 60/39.5; 60/770; 60/39.15; 60/39.12

(58) Field of Classification Search ............... 60/770, 60/39.83, 39.5, 226.1, 262, 39.12, 39.15; 181/213; 244/58
See application file for complete search history.

(56) References Cited

U.S. PATENT DOCUMENTS

| | | | |
|---|---|---|---|
| 5,265,408 A * | 11/1993 | Sheoran et al. | 60/782 |
| 5,655,359 A * | 8/1997 | Campbell et al. | 60/772 |
| 6,092,360 A * | 7/2000 | Hoag et al. | 60/783 |
| 6,272,838 B1 * | 8/2001 | Harvell et al. | 60/783 |
| 6,308,915 B1 * | 10/2001 | Liston et al. | 244/54 |
| 6,651,929 B2 * | 11/2003 | Dionne | 244/57 |
| 6,695,094 B2 * | 2/2004 | Moffat et al. | 181/249 |
| 7,337,605 B2 * | 3/2008 | Hagshenas | 60/39.08 |
| 7,350,619 B2 * | 4/2008 | Williams | 181/214 |
| 7,461,814 B2 * | 12/2008 | Hein et al. | 244/53 B |
| 7,578,369 B2 * | 8/2009 | Francisco et al. | 181/213 |
| 7,698,896 B2 * | 4/2010 | Sheoran et al. | 60/770 |
| 7,765,784 B2 * | 8/2010 | Lwasa et al. | 60/39.5 |
| 2005/0224635 A1 * | 10/2005 | Hein et al. | 244/10 |
| 2006/0059891 A1 * | 3/2006 | Sheoran et al. | 60/269 |
| 2006/0163425 A1 * | 7/2006 | Brown et al. | 244/53 B |
| 2006/0175836 A1 * | 8/2006 | Williams et al. | 285/414 |
| 2006/0180388 A1 * | 8/2006 | Brown et al. | 181/250 |
| 2006/0207826 A1 * | 9/2006 | Williams | 181/214 |

* cited by examiner

*Primary Examiner* — William H Rodriguez
*Assistant Examiner* — Carlos A Rivera
(74) *Attorney, Agent, or Firm* — Stephen G. Mican

(57) ABSTRACT

An exhaust duct system for a gas turbine engine that mounts within a tail cone of an aircraft, comprises an exhaust exit that exits one side of the tail cone offset from the axial centerline of the tail cone and an exhaust duct that couples the engine to the offset exhaust exit, with a straight section of the exhaust duct extending from the exhaust exit for a length that corresponds to at least one diameter of the exhaust duct.

22 Claims, 5 Drawing Sheets

LOW NOISE EXHAUST DUCTING SYSTEM

CROSS REFERENCE TO RELATED APPLICATIONS

This application relates to the subject matter described in Provisional Patent Application Ser. No. 60/783,314 filed 16 Mar. 2006 and claims the benefit of the filing date therefor.

FIELD OF THE INVENTION

The invention generally relates to exhaust systems for gas turbine engines, and more particularly to an exhaust ducting system for a gas turbine engine that reduces exhaust noise.

BACKGROUND OF THE INVENTION

Gas turbine engines have a high temperature exhaust that requires suitable exhaust ducting in most installations. In particular, a gas turbine engine that serves as an auxiliary power unit (APU) in an aircraft generally mounts within a restricted space in a tail section of the aircraft. Such a gas turbine engine must operate within stringent noise limits when operating whilst the aircraft is on the ground. An exhaust ducting system for such a gas turbine engine preferably comprises a straight section of exhaust duct between the gas turbine engine or an exhaust silencer and an exhaust exit in a tail cone of the aircraft for such engine to minimise exhaust noise due to aerodynamic flow separation at the exhaust exit. Such installations have required mounting of the exhaust duct and exhaust exit along the centreline of the tail cone.

However, it is often desirable to duct the gas turbine exhaust to exit on one side of the aircraft tail cone to shield exhaust noise from critical locations. Such installations have a turn near the exit of the exhaust duct to accommodate the side-mounted exhaust exit. However, there is a noise penalty to such an arrangement because the turn in the exhaust duct upstream of the exhaust exit causes aerodynamic flow separation of the exhaust gases, thereby increasing exhaust gas velocity and flow noise. Even the inclusion of an exhaust silencer is no help in this case, since generation of this flow noise is downstream of the exhaust silencer.

SUMMARY OF THE INVENTION

Generally, the invention comprises an exhaust duct system for a gas turbine engine that mounts within a tail cone of an aircraft, comprising an exhaust exit that exits one side of the tail cone offset from the axial centreline of the tail cone and an exhaust duct that couples the engine to the offset exhaust exit, with a straight section of the exhaust duct extending from the exhaust exit for a length that corresponds to at least one diameter of the exhaust duct.

DETAILED DESCRIPTION OF THE INVENTION

Figure 1:
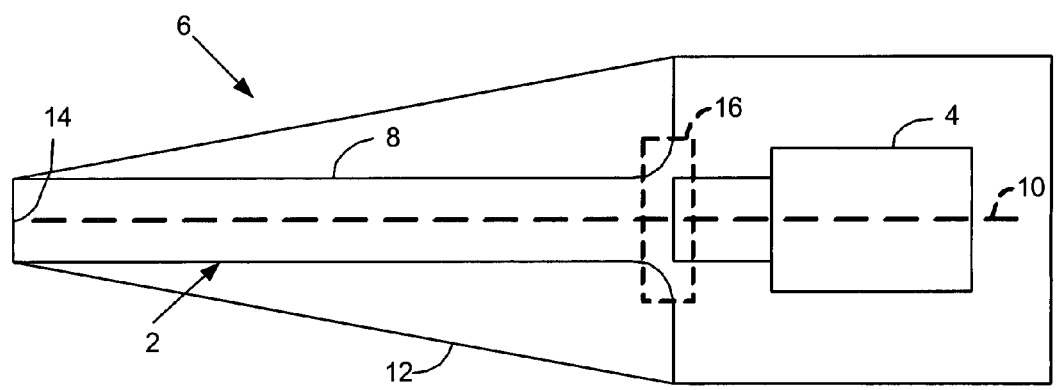
FIG. 1 is a cut-away top view of a prior art exhaust duct system for a gas turbine engine mounted in a tail section of an aircraft that has an exhaust exit that is along a centreline of a tail cone for the aircraft.
Figure 2:
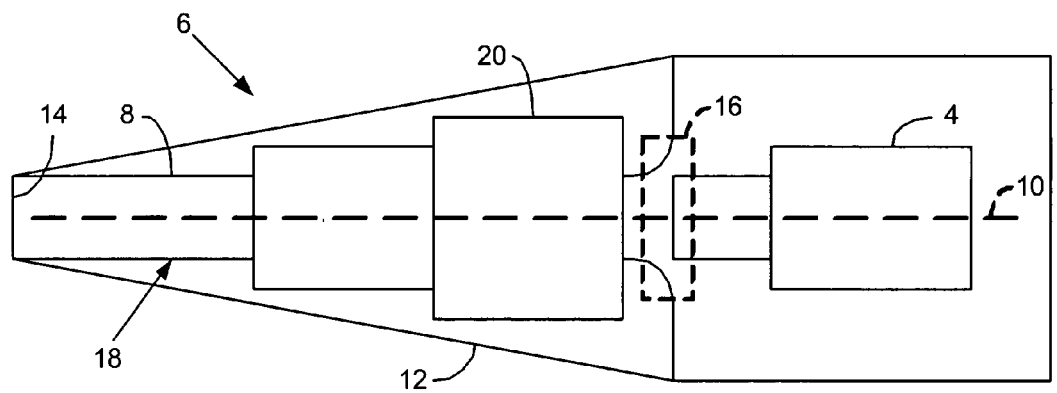
FIG. 2 is a cut-away top view of a prior art exhaust duct system for a gas turbine engine with an exhaust silencer mounted in a tail section of an aircraft that has an exhaust exit that is along a centreline of a tail cone for the aircraft.

FIG. 1 is a cut-away top view of a first exhaust duct system 2 for a gas turbine engine 4, such as an APU, mounted in a tail section 6 of an aircraft according to the prior art. The exhaust duct system 2 comprises a straight exhaust duct 8 mounted along an axial centreline 10 of a tail cone 12 for the aircraft that couples the gas turbine engine 4 to an exhaust exit 14 by way of an eductor 16. FIG. 2 is a cut-away top view of a second exhaust duct system 18 that is similar to the first exhaust duct system 2 shown in FIG. 1, except that it also comprises an exhaust silencer 20. Both of the exhaust systems 2 and 18 have straight exhaust ducts 8 that minimise aerodynamic flow separation of exhaust at the exhaust exit 14.

Figure 3:
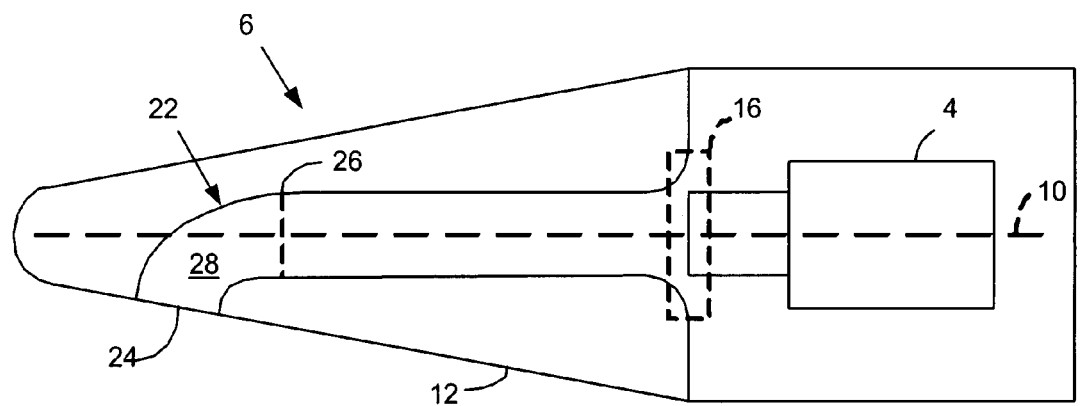
FIG. 3 is a cut-away top view of a prior art exhaust duct system for a gas turbine engine mounted in a tail section of an aircraft that has an exhaust exit that is offset from a centreline of a tail cone for the aircraft.
Figure 4:
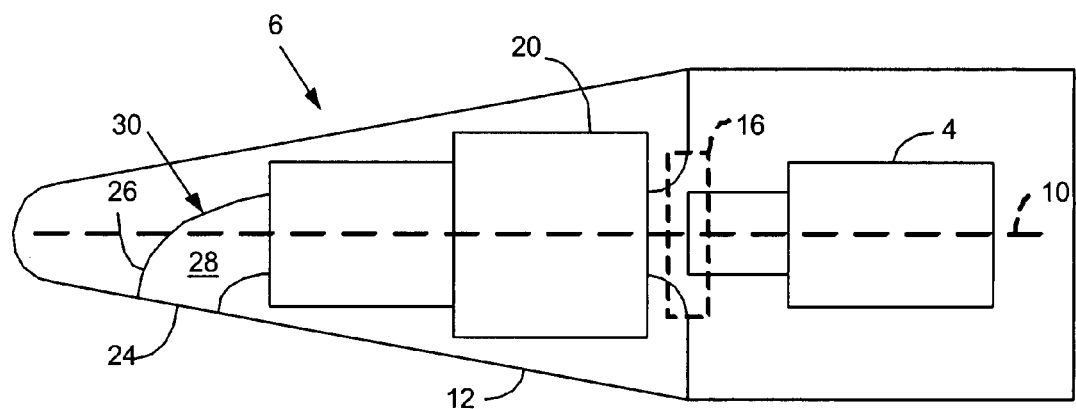
FIG. 4 is a cut-away top view of a prior art exhaust duct system for a gas turbine engine with an exhaust silencer mounted in a tail section of an aircraft that has an exhaust exit that is offset from a centreline of a tail cone for the aircraft.

FIG. 3 is a cut-away top view of a third exhaust duct system 22 according to the prior art that is similar to the first exhaust duct system 2 shown in FIG. 1, except that it has an exhaust exit 24 that is offset from the centreline 10 of the tail cone 12. The offset is desirable so that the exhaust exit 24 exits one side of the tail cone 12 to shield exhaust noise from critical locations on the opposite side of the tail cone 12. In this case, the exhaust duct system 22 has an exhaust duct 26 with a bend 28 upstream of the exhaust exit 24 to accommodate its offset from the centreline 10. FIG. 4 is a cut-away top view of a fourth exhaust duct system 30 according to the prior art that is similar to the third exhaust system 22 except that it also comprises the exhaust silencer 20. Both of the exhaust systems 22 and 30 have excessive noise due to the bend 28 in the exhaust duct 26 directly upstream of the exhaust exit 24 that causes aerodynamic flow separation of the exhaust gases, thereby increasing exhaust gas velocity and noise. Unfortunately, the exhaust silencer 20 does nothing to suppress noise due to the aerodynamic flow separation of the exhaust gases caused by the bend in the exhaust system 28 because it occurs downstream of the exhaust silencer 20. There is insufficient clearance for the exhaust silencer 20 to have a placement downstream of the bend in the exhaust system 28.

Figure 5:
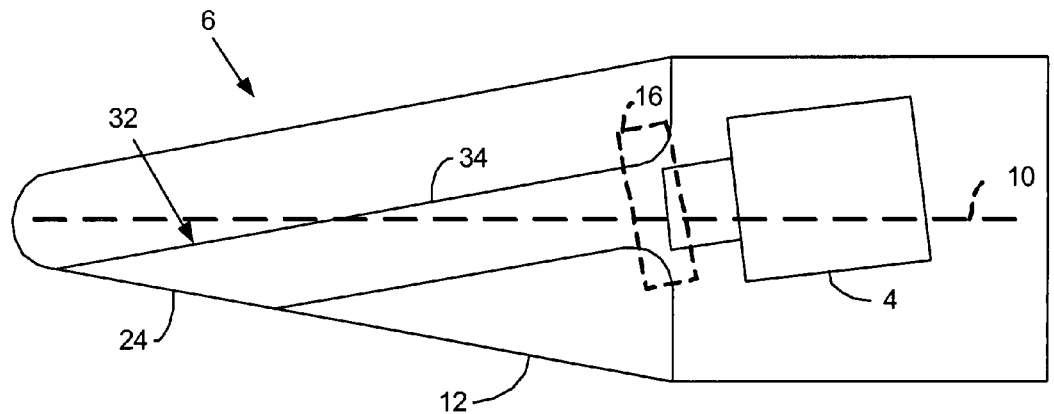
FIG. 5 is a cut-away top view of an exhaust duct system for a gas turbine engine mounted in a tail section of an aircraft according to a first possible embodiment of the invention that has a straight exhaust duct that couples the gas turbine engine to an exhaust exit that is offset from a centreline of a tail cone for the aircraft.
Figure 6:
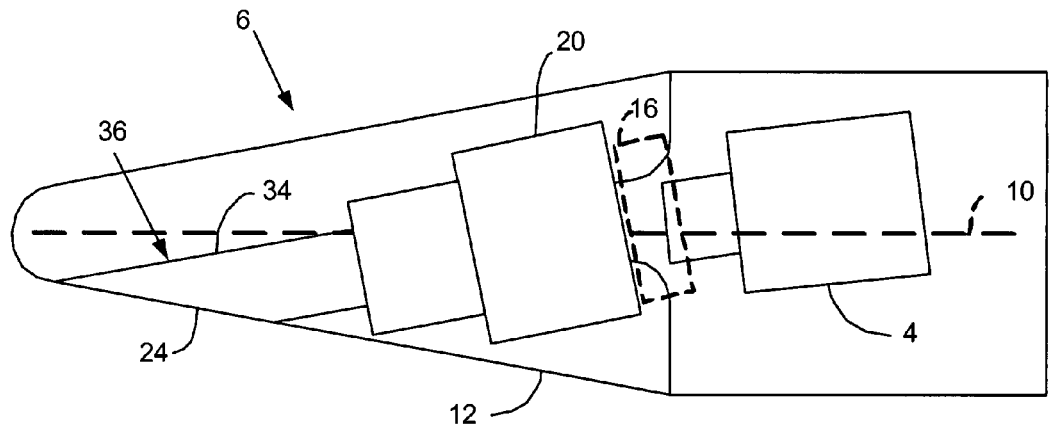
FIG. 6 is a cut-away top view of an exhaust duct system for a gas turbine engine with an exhaust silencer mounted in a tail section of an aircraft according to a second possible embodiment of the invention that has a straight exhaust duct that couples the gas turbine engine to exhaust exits that are offset from a centreline of a tail cone for the aircraft.

FIG. 5 is a cut-away top view of an exhaust duct system 32 according to a first possible embodiment of the invention. It has a straight exhaust duct 34 that couples the gas turbine engine 4 to the offset exhaust exit 24. This arrangement is possible because the gas turbine engine 4 mounts within the tail cone 12 at an angle with the centreline 10 in line with the straight exhaust duct 34. Consequently, even though the exhaust duct system 32 has its exhaust exit 24 offset from the centreline 10 of the tail cone 12 there is no resulting aerodynamic flow separation of the exhaust gas in its exhaust. FIG. 6 is a cut-away top view of an exhaust duct system 36 according to a second possible embodiment of the invention. It is similar to the exhaust duct system 32 shown in FIG. 5 except that it also comprises the exhaust silencer 20. In this case, the exhaust silencer 20 may operate effectively since there is no bend in the straight exhaust duct 34 and therefore no resultant aerodynamic flow separation of the exhaust gas in its exhaust.

Figure 7:
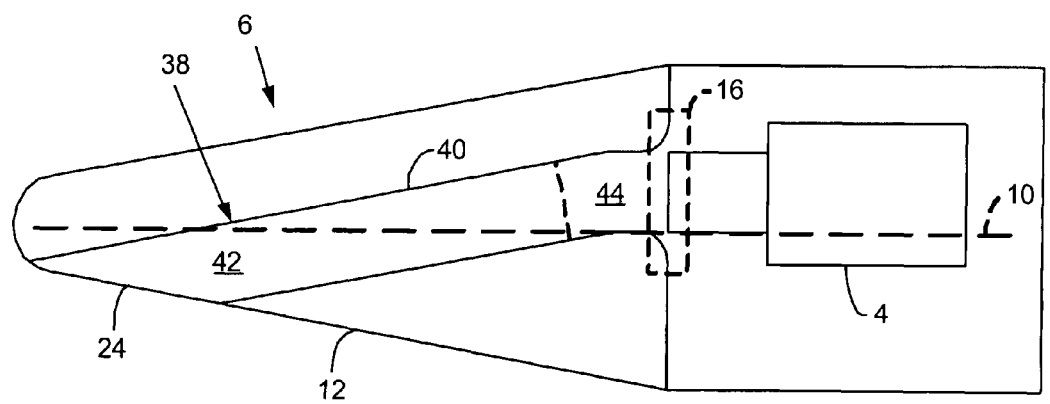
FIG. 7 is a cut-away top view of an exhaust duct system for a gas turbine engine mounted in a tail section of an aircraft according to a third embodiment the invention that has an exhaust duct that couples the gas turbine engine to an exhaust exit that is offset from a centreline of a tail cone for the aircraft with a bend in the exhaust duct upstream of a straight exhaust section that couples to the exhaust exit.
Figure 8:
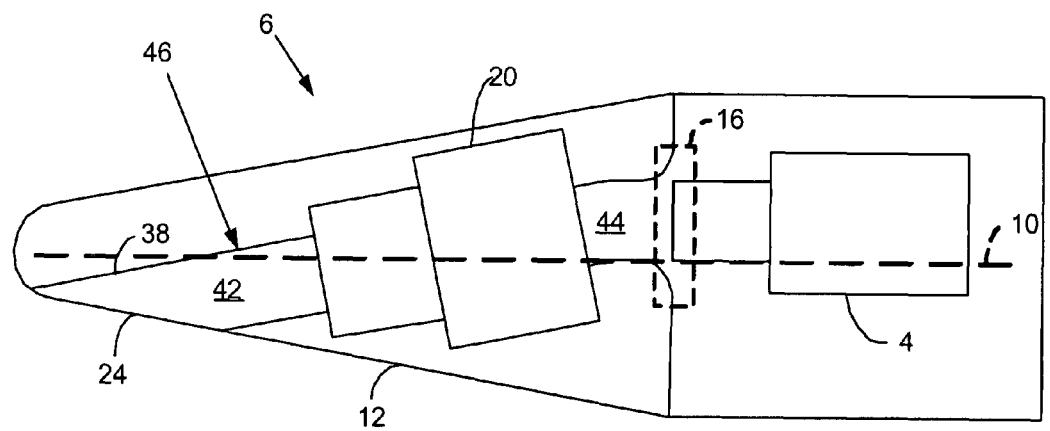
FIG. 8 is a cut-away top view of an exhaust duct system for a gas turbine engine with an exhaust silencer mounted in a tail section of an aircraft according to a fourth embodiment the invention that has an exhaust duct that couples the gas turbine engine to an exhaust exit that is offset from a centreline of a tail cone for the aircraft with a bend in the exhaust duct upstream of a straight exhaust section that couples to the exhaust exit.

FIG. 7 is a cut-away top view of an exhaust duct system 38 according to a third possible embodiment of the invention. It has an exhaust duct 40 with a straight section 42 immediately upstream of the offset exhaust exit 24 and a bend 44 upstream of the straight section 42 to accommodate coupling to the gas turbine engine 4, which in this case mounts within the tail cone 12 in general axial alignment with the centreline 10. The straight section 42 should be at least one diameter, and preferably at least three diameters of the exhaust duct 38 in length to minimise aerodynamic flow separation of exhaust that the upstream bend 44 in the exhaust duct 40 would otherwise induce. FIG. 8 is a cut-away top view of an exhaust system 46 according to a fourth possible embodiment of the invention. It is similar to the exhaust duct system 38 shown in FIG. 7, except that it also comprises the exhaust silencer 20. In this case, the exhaust silencer 20 may operate effectively since the bend 44 in the exhaust duct 40 is upstream of the exhaust silencer 20.

Figure 9:
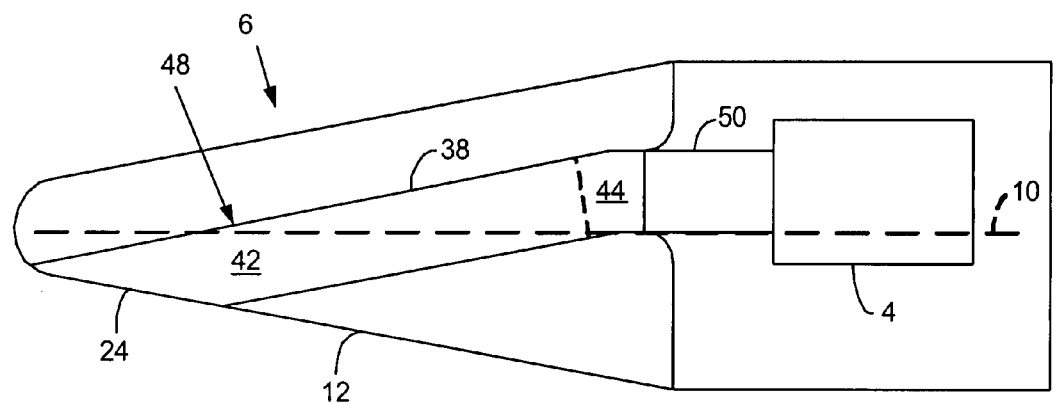
FIG. 9 is a cut-away top view of an exhaust duct system for a gas turbine engine mounted in a tail section of an aircraft according to a fifth embodiment the invention that has an exhaust duct that couples the gas turbine engine to an exhaust exit that is offset from a centreline of a tail cone for the aircraft with a bend in the exhaust duct upstream of a straight exhaust section that couples to the exhaust exit.
Figure 10:
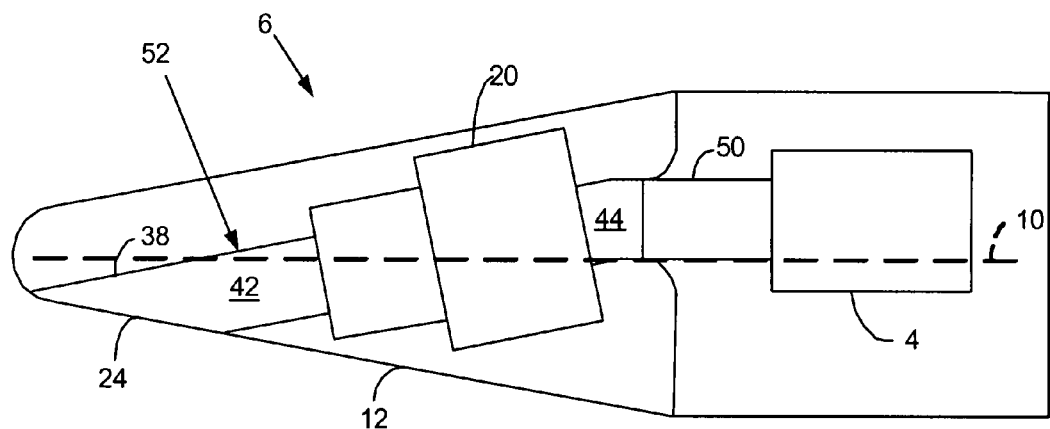
FIG. 10 is a cut-away top view of an exhaust duct system for a gas turbine engine with an exhaust silencer mounted in a tail section of an aircraft according to a sixth embodiment the invention that has an exhaust duct that couples the gas turbine engine to an exhaust exit that is offset from a centreline of a tail cone for the aircraft with a bend in the exhaust duct upstream of a straight exhaust section that couples to the exhaust exit.

The eductor 16 as shown in FIGS. 1 through 8 is optional. FIG. 9 is a cut-away top view of an exhaust duct system 48 according to a fifth possible embodiment of the invention that has no educator 16. It is similar to the third embodiment of the invention shown in FIG. 7, except that the gas turbine engine 4 couples directly to the exhaust duct 38, such as by way of a suitable duct 50. FIG. 10 is a cut-away top view of an exhaust duct system 52 according to a sixth possible embodiment of the invention that has no eductor 16. It is similar to the fourth embodiment of the invention shown in FIG. 8, except that the gas turbine engine 4 couples directly to the exhaust duct 38, such as by way of the duct 50.

The described embodiments of the invention are only some illustrative implementations of the invention wherein changes and substitutions of the various parts and arrangement thereof are within the scope of the invention.

The claimed invention is:

1. An exhaust duct system for a gas turbine engine mounts within a tail cone of an aircraft which tail cone has a bisecting axial centreline between two sides of the tail cone and the gas turbine engine mounts closer to one side of the tail cone than the other side, comprising:
    an exhaust exit that exits the side of the tail cone furthest from the gas turbine engine;
    and an exhaust duct that couples the engine to the exhaust exit, with a straight section of the exhaust duct extending from the exhaust exit for a length that corresponds to at least one diameter of the exhaust duct.

2. The exhaust duct system of claim 1, wherein the straight section of the exhaust duct extends for a length that corresponds to at least three diameters of the exhaust duct.

3. The exhaust duct system of claim 1, wherein the entire length of the exhaust duct is generally straight.

4. The exhaust duct system of claim 3, wherein the gas turbine engine mounts at an angle with the bisecting axial centreline of the tail cone in line with the straight exhaust duct.

5. The exhaust duct system of claim 1, wherein the exhaust duct has a bend upstream of its straight section near the engine.

6. The exhaust duct system of claim 1, wherein the exhaust duct couples to the engine by way of an eductor.

7. The exhaust duct system of claim 1, wherein the exhaust duct couples directly to the engine with no eductor.

8. The exhaust duct system of claim 1, further comprising an exhaust silencer mounted along the straight section of the exhaust duct.

9. The exhaust duct system of claim 1, further comprising an aircraft tail cone that encases the exhaust duct system.

10. An exhaust duct system for a gas turbine engine mounts within a tail cone of an aircraft, which tail cone has a bisecting axial centerline between two side of the tail cone and the gas turbine engine mounts closer to one side of the tail cone than the other side, comprising:
    an exhaust exit that exits the side of the tail cone furthest from the gas turbine engine; and
    a generally straight exhaust duct that couples the engine to the exhaust exit such that the engine mounts within the tail cone offset from the bisecting axial centreline of the tail cone.

11. The exhaust duct system of claim 10, wherein the exhaust duct couples to the engine by way of an eductor.

12. The exhaust duct system of claim 10, wherein the exhaust duct couples directly to the engine with no eductor.

13. An exhaust duct system for a gas turbine mounts within a tail cone of an aircraft, which tail cone has a bisecting axial centreline between two sides of the tail cone and the gas turbine engine mounts closer to one side of the tail cone than the other side, comprising:
    an exhaust exit that exits the side of the tail cone furthest from the gas turbine engine; and
    an exhaust duct that couples the engine to the exhaust exit, with a straight section of the exhaust duct extending from the exhaust exit for a length that corresponds to at least one diameter of the exhaust duct and a bend upstream of its straight section near the engine such that the engine mounts in general axial alignment with the bisecting axial centreline of the tail cone.

14. The exhaust duct system of claim 13, wherein the straight section of the exhaust duct extends for a length that corresponds to at least three diameters of the exhaust duct.

15. The exhaust duct system of claim 13, wherein the exhaust duct couples to the engine by way of an eductor.

16. The exhaust duct system of claim 13, wherein the exhaust duct couples directly to the engine with no eductor.

17. The exhaust duct system of claim 13, further comprising an aircraft tail cone that encases the exhaust duct system.

18. A gas turbine engine that mounts within a tail cone of an aircraft, which tail cone has a bisecting axial centreline between two sides of the tail cone and the gas turbine engine mounts closer to one side of the tail cone than the other, with an exhaust duct system comprising:

an exhaust exit that exits the side of the tail cone furthest from the gas turbine engine; and an exhaust duct that couples the engine to the exhaust exit, with a straight section of the exhaust duct extending from the exhaust exit for a length that corresponds to at least one diameter of the exhaust duct.

19. The gas turbine engine of claim 18, wherein the exhaust duct couples to the engine by way of an eductor.

20. The gas turbine engine of claim 18, wherein the exhaust duct couples directly to the engine with no eductor.

21. The gas turbine engine of claim 18, further comprising an exhaust silencer mounted along the straight section of the exhaust duct.

22. The gas turbine engine of claim 18, further comprising an aircraft tail cone that encases the exhaust duct system.

* * * * *